United States Patent
Nagae (10) Patent No.: US 7,945,744 B2
(45) Date of Patent: May 17, 2011

(54) INTERFACE CIRCUIT

(75) Inventor: Yoshihiro Nagae, Oizumi-machi (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 0 days.

(21) Appl. No.: 12/748,481

(22) Filed: Mar. 29, 2010

(65) Prior Publication Data

US 2010/0253388 A1 Oct. 7, 2010

(30) Foreign Application Priority Data

Apr. 3, 2009 (JP) ................................. 2009-091436

(51) Int. Cl.
*G06F 13/00* (2006.01)
*G06F 3/00* (2006.01)
(52) U.S. Cl. .......... 711/154; 711/111; 711/167; 710/52; 710/58
(58) Field of Classification Search .......... 711/102–104, 711/111, 154, 167; 710/52, 58, 1–4, 12, 710/13, 20; 326/86, 63
See application file for complete search history.

(56) References Cited

U.S. PATENT DOCUMENTS

| 5,809,336 | A  | * | 9/1998 | Moore et al. ..................... 710/25 |
| 6,449,681 | B1 | * | 9/2002 | Gama et al. ........................ 711/5 |
| 6,591,294 | B2 | * | 7/2003 | Kawasaki et al. ............. 709/209 |
| 7,382,681 | B2 | * | 6/2008 | Yada et al. ................ 365/233.12 |
| 7,394,716 | B1 | * | 7/2008 | Chakrapani et al. ..... 365/230.03 |
| 7,730,268 | B2 | * | 6/2010 | Maheshwari et al. ......... 711/154 |

FOREIGN PATENT DOCUMENTS

JP 08-016487 A 1/1996

* cited by examiner

*Primary Examiner* — Vibol Tan
(74) *Attorney, Agent, or Firm* — Osha • Liang LLP (57) ABSTRACT

An interface circuit comprising: a first output circuit configured to allow an access signal to be input thereto and output the access signal to a storage circuit, the access signal capable of being changed to one logic level or the other logic level for accessing the storage circuit; a second output circuit configured to output the access signal outputted from the first output circuit; and a comparison circuit configured to compare the number of times a logic level of the access signal inputted to the first output circuit is changed and the number of times a logic level of the access signal outputted from the second output circuit is changed, and output a comparison signal indicating whether predetermined access has been performed based on the access signal inputted to the first output circuit, after at least a part of the access signal is inputted to the first output circuit.

5 Claims, 4 Drawing Sheets

INTERFACE CIRCUIT

CROSS-REFERENCE TO RELATED APPLICATION

This application claims the benefit of priority to Japanese Patent Application No. 2009-91436, filed Apr. 3, 2009, of which full contents are incorporated herein by reference.

BACKGROUND OF THE INVENTION

1. Field of the Invention

The present invention relates to an interface circuit.

2. Description of the Related Art

In general, between circuits with different functions, such as between a memory and a memory control circuit or between a motor driving circuit and a microcomputer, logic level data is transmitted/received to perform predetermined processing. For example, a memory control circuit changes a logic level of an access signal on the basis of an access request from a processor, to perform memory access. Therefore, if the logic level of the access signal is changed by a noise or the like, the memory control circuit may not be able to perform access normally. Thus, some memory control circuits add parity bits to data in the access signals to detect whether or not the memory access is normal (See Japanese Patent Laid-Open Publication NO. 8-16487, for example). Specifically, such memory control circuit adds a parity bit to inputted data and writes the data added with the parity bit into the memory based on a writing instruction from the processor. The memory control circuit also reads the data added with the parity bit from the memory on the basis of a reading instruction from the processor. Then, the memory control circuit detects whether or not the memory access is normal by inspecting the parity bit.

As mentioned above, if a parity bit is added to data to be transmitted/received between the memory and the memory control circuit, for example, it becomes possible to detect whether or not there is an error in the data by inspecting the parity bit. However, if a parity bit is added to the data to be transmitted/received, the amount of the data to be transmitted/received between the memory and the memory control circuit is increased, which is a problem.

SUMMARY OF THE INVENTION

An interface circuit according to an aspect of the present invention, comprises: a first output circuit configured to allow an access signal to be input thereto and output the access signal to a storage circuit, the access signal being changed to one logic level or the other logic level so as to access the storage circuit; a second output circuit configured to output the access signal outputted from the first output circuit; and a comparison circuit configured to compare the number of times a logic level of the access signal inputted to the first output circuit is changed and the number of times a logic level of the access signal outputted from the second output circuit is changed, and output a comparison signal indicating whether or not predetermined access has been performed on the basis of the access signal inputted to the first output circuit, after at least a part of the access signal is inputted to the first output circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
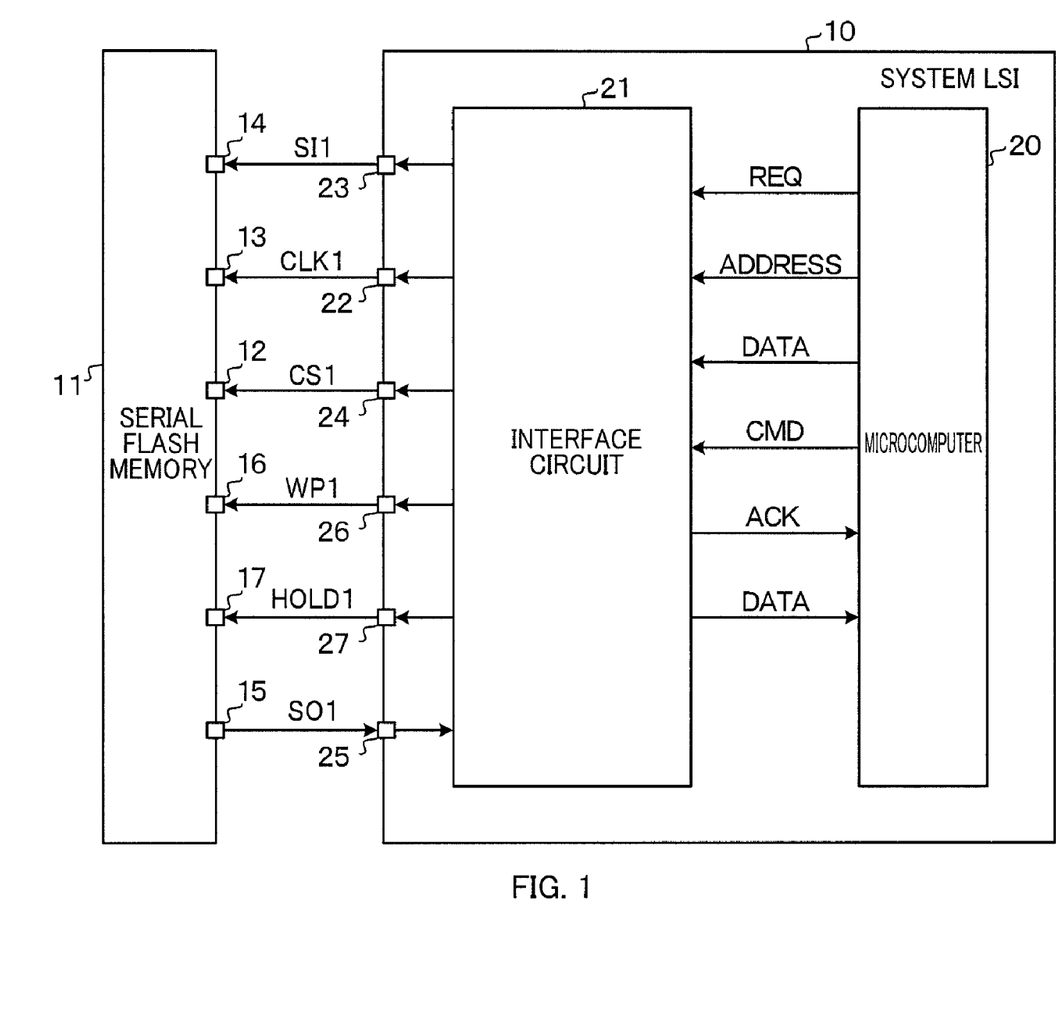
FIG. 1 is a diagram illustrating a configuration of a system LSI 10 according to an embodiment of the present invention.

FIG. 1 is a diagram illustrating a configuration of a system LSI (Large Scale Integration) 10 according to an embodiment of the present invention.

The system LSI 10 is included in an optical disc device (not shown), for example, and includes a microcomputer 20, an interface circuit 21, and terminals 22 to 27. The system LSI 10 executes a program stored in a serial flash memory 11 to control the optical disc device (not shown), for example.

The serial flash memory 11 (storage circuit) is a nonvolatile memory and includes terminals 12 to 17. In an embodiment according to the present invention, program data to be executed by the microcomputer 20 and various types of data processed by the microcomputer 20 are stored therein. The serial flash memory 11 is synchronized with a clock CLK1 inputted to the terminal 13 when access from the system LSI 10 is enabled on the basis of a signal CS1 inputted to the terminal 12, and reads access data SI1 inputted to the terminal 14. The access data SI1 according to an embodiment of the present invention includes an address of an area in which program data or the like is stored, a command indicating read or write, and write data. Read data SO1 in the case of read access to the serial flash memory 11 is outputted from the terminal 15. The serial flash memory 11 according to an embodiment of the present invention prevents wrong data from being written on the basis of a signal WP1 inputted to the terminal 16, and disables the clock CLK1 inputted to the terminal 13 on the basis of a signal HOLD1 inputted to the terminal 17.

The microcomputer 20 is a circuit that controls the interface circuit 21 and performs processing on the basis of the program data or the like outputted from the interface circuit 21. The microcomputer 20 according to an embodiment of the present invention outputs access request data REQ, an address ADDRESS, data DATA, and a command CMD to the interface circuit 21, to allow the interface circuit 21 to access a storage area with a predetermined address in the serial flash memory 11.

The interface circuit 21 is a circuit that accesses the serial flash memory 11 on the basis of the access request data REQ from the microcomputer 20. In an embodiment of the present invention, the clock CLK1 and the signal CS1 are outputted to the terminal 22 and the terminal 24, respectively, on the basis of the access request data REQ inputted from the microcomputer 20, and the access data SI1 is outputted to the terminal 23 on the basis of the access request data REQ, the address ADDRESS, the data DATA, and the command CMD. The interface circuit 21 outputs a signal ACK indicating whether or not predetermined access has been performed to the microcomputer 20 if the predetermined access has been completed. When the read access is performed for the serial flash memory 11, the read data SO1 is inputted to the terminal 25, and thus, the interface circuit 21 outputs the read data SO1 as the data DATA to the microcomputer 20. Moreover, the interface circuit 21 according to an embodiment of the present invention outputs the signal WP1 to the terminal 26 on the basis of the access request data REQ, so as to prevent wrong data from being written in the serial flash memory 11, and the interface circuit 21 outputs the signal HOLD1 to the terminal 27 on the basis of the access request data REQ, so as to disable the clock CLK1 inputted to the serial flash memory 11. The interface circuit 21 corresponds to the interface circuit.

Figure 2:
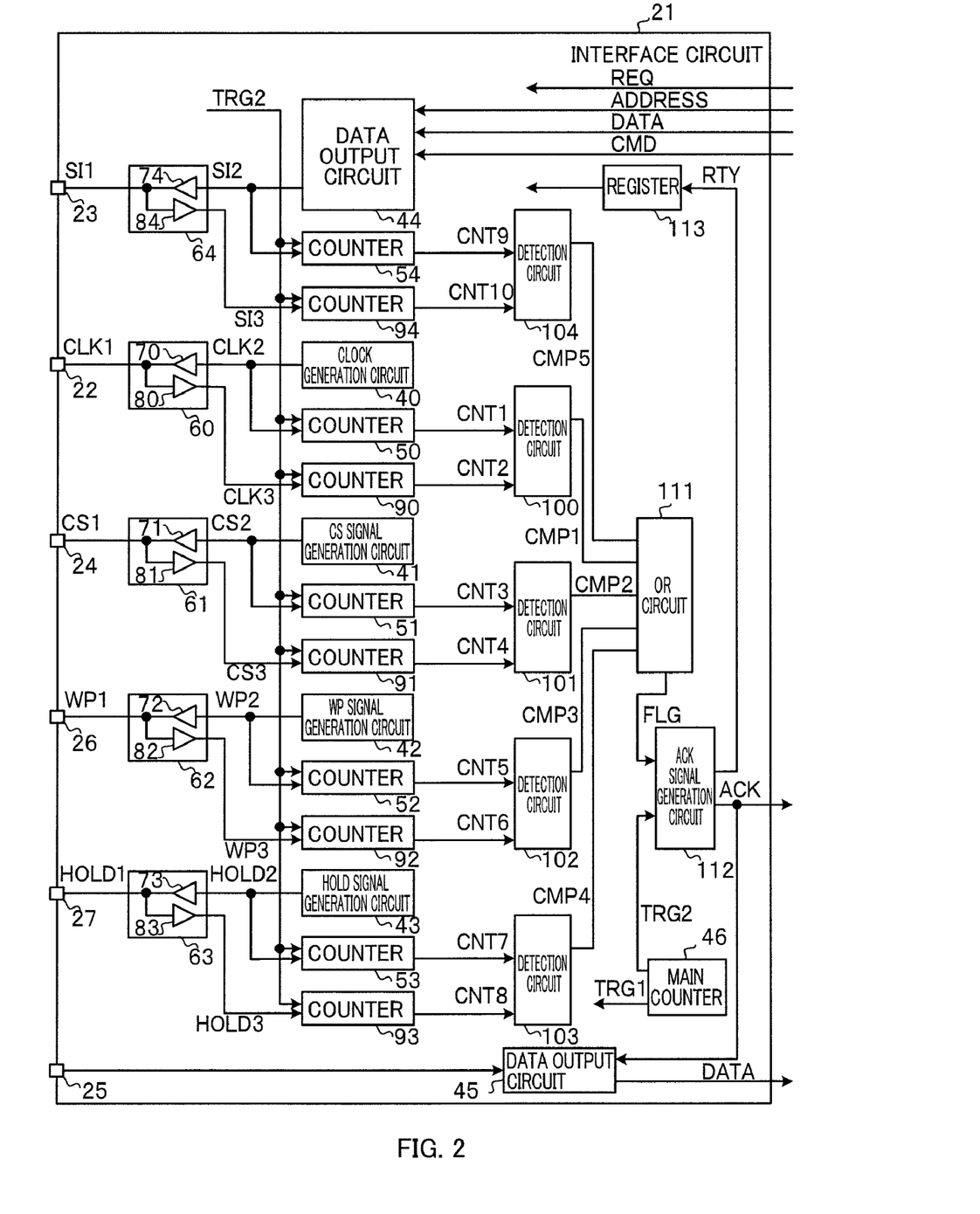
FIG. 2 is a diagram illustrating a configuration of an interface circuit 21 according to an embodiment of the present invention.

FIG. 2 is a diagram illustrating a configuration of the interface circuit 21.

The interface circuit 21 includes a clock generation circuit 40, a CS signal generation circuit 41, a WP signal generation circuit 42, a HOLD signal generation circuit 43, data output circuits 44 and 45, a main counter 46, counters 50 to 54 and 90 to 94, I/O buffers 60 to 64, detection circuits 100 to 104, an OR circuit 111, an ACK signal generation circuit 112, and a register 113.

The clock generation circuit 40 (access signal generation circuit) is a circuit that outputs a clock CLK2 (access signal) for the interface circuit 21 to access the serial flash memory 11 on the basis of the inputted access request data REQ. In an embodiment of the present invention, output of the clock CLK2 is started with predetermined timing from a time when the access request data REQ is inputted, and the clock CLK2 continues to be outputted during a period on the basis of the access request data REQ.

The CS signal generation circuit 41 (access signal generation circuit) is a circuit that outputs a signal CS2 (access signal) for the interface circuit 21 to enable access to the serial flash memory 11 on the basis of the inputted access request data REQ. In an embodiment of the present invention, a logic level of the signal CS2 is set at L level for a predetermined period so that access can be performed on the basis of the access request data REQ.

The WP signal generation circuit 42 (access signal generation circuit) is a circuit that outputs a signal WP2 (access signal) for the interface circuit 21 to prevent wrong data from being written in the serial flash memory 11 on the basis of the inputted access request data REQ. The WP signal generation circuit 42 according to an embodiment of the present invention outputs an L-level signal WP2 on the basis of the access request data REQ for preventing writing. On the other hand, if the access request data REQ for allowing writing is inputted, an H-level signal WP2 is outputted.

The HOLD signal generation circuit 43 (access signal generation circuit) is a circuit that outputs a signal HOLD2 (access signal) for the interface circuit 21 to interrupt access by disabling the clock CLK1 inputted to the serial flash memory 11, on the basis of the inputted access request data REQ. Specifically, the HOLD signal generation circuit 43 changes the logic level of the signal HOLD 2 from the H level to the L level if the access request data REQ for interrupting the access is inputted.

The data output circuit 44 (access signal generation circuit) holds the address ADDRESS, the data DATA, and the command CMD inputted from the microcomputer 20. The data DATA is inputted from the microcomputer 20 only when the interface circuit 21 performs write access to the serial flash memory 11. Then, the data output circuit 44 outputs to the I/O buffer 64 the command CMD, the address ADDRESS, the data DATA in this order, which are held as a signal SI2 (access signal), if the access request data REQ is inputted. In an embodiment of the present invention, the held address ADDRESS, data DATA, and command CMD are supposed to be updated each time they are inputted from the microcomputer 20.

The data output circuit 45 holds the read data SO1 inputted from the serial flash memory 11 in the read access. If the signal ACK is inputted from the ACK signal generation circuit 112, which will be described later, the data output circuit 45 outputs the held read data SO1 to the microcomputer 20 as the data DATA. In an embodiment of the present invention, it is assumed that each time the read data SO1 is inputted from the serial flash memory 11, the held read data SO1 is updated.

The main counter 46 is a circuit of which the maximum count value changes, and which counts rising edges of the inputted clock CLK2, on the basis of the inputted access request data REQ. The maximum count value of the main counter 46 according to an embodiment of the present invention is a value obtained by counting all the rising edges of the inputted clock CLK2. For example, if the clock generation circuit 40 outputs the clock CLK2 with the cycle number of 41 on the basis of the access request data REQ for allowing read access, the maximum count value of the main counter 46 is 41. The main counter 46 according to an embodiment of the present invention outputs an instruction signal TRG1 to the detection circuits 100 to 104 if the count value of the main counter 46 reaches a value smaller than the maximum count value by 1. If the count value of the main counter 46 becomes the maximum, the main counter 46 outputs an instruction signal TRG2 to the counters 50 to 54 and the ACK signal generation circuit 112, which will be described later. For example, in the case where the maximum count value of the main counter 46 is 41, when the count value of the main counter 46 reaches 40, the instruction signal TRG1 is outputted, and when the count value of the main counter 46 reaches 41, the instruction signal TRG2 is outputted.

The counter 50 (first counter) counts the rising edges of the inputted logic-level signal, to be output as a count value. If the instruction signal TRG2 is inputted to the counter 50 from the main counter 46, the count value of the counter 50 is reset. To the counter 50 according to an embodiment of the present invention, the clock CLK2 from the clock generation circuit 40 is inputted. Thus, the counter 50 counts the rising edges of the clock CLK2 that is inputted while predetermined access is performed, to be output as a count value CNT1.

The counters 51 to 54 are similar to the counter 50 except that logic-level signals respectively inputted thereto are the signal CS2, the signal WP2, the signal HOLD2, and the signal SI2, respectively. Thus, the counters 51 to 54 count the rising edges of the inputted signal CS2, signal WP2, signal HOLD2, and signal SI2, to be output as count values CNT3, CNT5, CNT7, and CNT9, respectively. Each of the counters 51 to 54 corresponds to the first counter.

The I/O buffer 60 is a circuit that outputs the inputted logic-level signal to the serial flash memory 11 and that detects a noise generated in a signal line or the like connecting the system LSI 10 and the serial flash memory 11. The I/O buffer 60 according to an embodiment of the present invention includes output circuits 70 and 80.

The output circuit 70 (first output circuit) is a buffer circuit that outputs an inputted logic-level signal. Specifically, an H-level signal is outputted according to the H-level signal, and an L-level signal is outputted according to the L-level signal. Since the clock CLK2 is inputted to the output circuit 70 of an embodiment of the present invention, the clock CLK2 is outputted as the clock CLK1 to the terminal 22.

The output circuit 80 (second output circuit) is a circuit that compares a level of an input voltage with that of a predetermined threshold voltage, to be output as a signal of a logic level. Specifically, if the input voltage is higher in level than the threshold voltage, an H-level signal is outputted, while if the input voltage is lower in level than the threshold voltage, an L-level signal is outputted. Since an input of the output circuit 80 of an embodiment of the present invention is connected to the terminal 22, there is outputted a signal of a logic level according to change in a voltage level of the terminal 22. Specifically, if a noise is not generated in the terminal 22 while the clock CLK1 is outputted from the output circuit 70, that is, if the voltage level of the terminal 22 is changed only on the basis of the clock CLK1, the clock CLK1 is outputted as a clock CLK3. On the other hand, if a noise is generated in the terminal 22 while the clock CLK1 is outputted from the output circuit 70, that is, if the voltage level of the terminal 22 is changed on the basis of the clock CLK1 and the noise, there is outputted the clock CLK3 according to the voltage determined on the basis of the clock CLK1 and the noise.

In an embodiment of the present invention, the I/O buffers 61 to 64 have configurations similar to that of the I/O buffer 60, and include the output circuits 71 to 74 and the output circuits 81 to 84, respectively. The output circuits 71 to 74 have configurations similar to that of the output circuit 70. The output circuits 71 to 74 output the inputted signal CS2, signal WP2, signal HOLD2, and signal SI2, as the signal CS1, signal WP1, signal HOLD1, and signal SI1, respectively. Moreover, the output circuits 81 to 84 have configurations similar to that of the output circuit 80. Inputs of the output circuits 81 to 84 are connected to the terminal 24, the terminal 26, the terminal 27, and the terminal 23, respectively. Therefore, the output circuits 81 to 84 output a signal CS3, a signal WP3, a signal HOLD3, and a signal SI3 according to the respective voltage levels of the terminal 24, the terminal 26, the terminal 27, and the terminal 23. Each of the output circuits 71 to 74 corresponds to the first output circuit, and each of the output circuits 81 to 84 corresponds to the second output circuit.

The counter 90 (second counter) counts the rising edges of an inputted logic-level signal, to be output as a count value. If the instruction signal TRG2 is inputted to the counter 90 from the main counter 46, the count value of the counter 90 is reset. To the counter 90 according to an embodiment of the present invention, the clock CLK3 is inputted from the output circuit 80. Thus, the counter 90 counts the rising edges of the clock CLK3 that is inputted while a predetermined access is performed, to be output as a count value CNT2.

The counters 91 to 94 are the same as the counter 90 except that logic-level signals respectively inputted thereto are the signal CS3, the signal WP3, the signal HOLD3, and the signal SI3. Thus, the counters 91 to 94 count the rising edges of the inputted signal CS3, signal WP3, signal HOLD3, and signal SI3, to be output as count values CNT4, CNT6, CNT8, and CNT10. Each of the counters 91 to 94 corresponds to the second counter.

If the instruction signal TRG1 is inputted from the main counter 46, the detection circuit 100 (comparison signal output circuit) reads the count value CNT1 inputted from the counter 50 and the count value CNT2 inputted from the counter 90, to be compared. And if the compared count values are equal as a comparison result, an L-level comparison signal CMP1 (comparison signal) is outputted. On the other hand, if the compared count values are not equal as a comparison result, an H-level comparison signal CMP1 (comparison signal) is outputted. In an embodiment of the present invention, it is assumed that the held count values are updated each time they are inputted from the counter 50 and the counter 90.

The detection circuits 101 to 104 are the same as the detection circuit 100 except that the respectively inputted count values are the count values CNT3, 4, the count values CNT5, 6, the count values CNT7, 8, and the count values CNT9, 10. Thus, the detection circuits 101 to 104 read the count values CNT3, 4, the count values CNT5, 6, the count values CNT7, 8, and the count values CNT9, 10, to be compared, and output the comparison signals CMP2, CMP3, CMP4, and CMP5, respectively. Each of the detection circuits 101 to 104 corresponds to the comparison signal output circuit, and each of the comparison signals CMP2 to 5 corresponds to the comparison signal.

The counters 50, 90 and the detection circuit 100, the counters 51, 91 and the detection circuit 101, the counters 52, 92 and the detection circuit 102, the counters 53, 93 and the detection circuit 103, and the counters 54, 94 and the detection circuit 104 correspond to the comparison circuit.

The OR circuit 111 outputs an L-level signal FLG if the comparison signals CMP1 to 5 respectively inputted from the detection circuits 100 to 104 are all at the L level. Also, if any of the comparison signals CMP 1 to 5 respectively inputted from the detection circuits 100 to 104 is at the H level, the OR circuit 111 outputs an H-level signal FLG.

When the instruction signal TRG2 is inputted from the main counter 46, if the signal FLG inputted from the OR circuit 111 is at the L level, the ACK signal generation circuit 112 outputs the signal ACK to the data output circuit 45 and the microcomputer 20. When the instruction signal TRG2 is inputted from the main counter 46, if the signal FLG inputted from the OR circuit 111 is at the H level, the ACK signal generation circuit 112 outputs a re-access request signal RTY to the register 113.

The register 113 holds the access request data REQ inputted from the microcomputer 20. Then, if the re-access request signal RTY is inputted from the ACK signal generation circuit 112, the register outputs the held access request data REQ to the clock generation circuit 40, the CS signal generation circuit 41, the WP signal generation circuit 42, the HOLD signal generation circuit 43, and the data output circuit 44, so as to perform predetermined access again. In an embodiment of the present invention, it is assumed that the held access request data REQ is updated each time it is inputted from the microcomputer 20.

Figure 3:
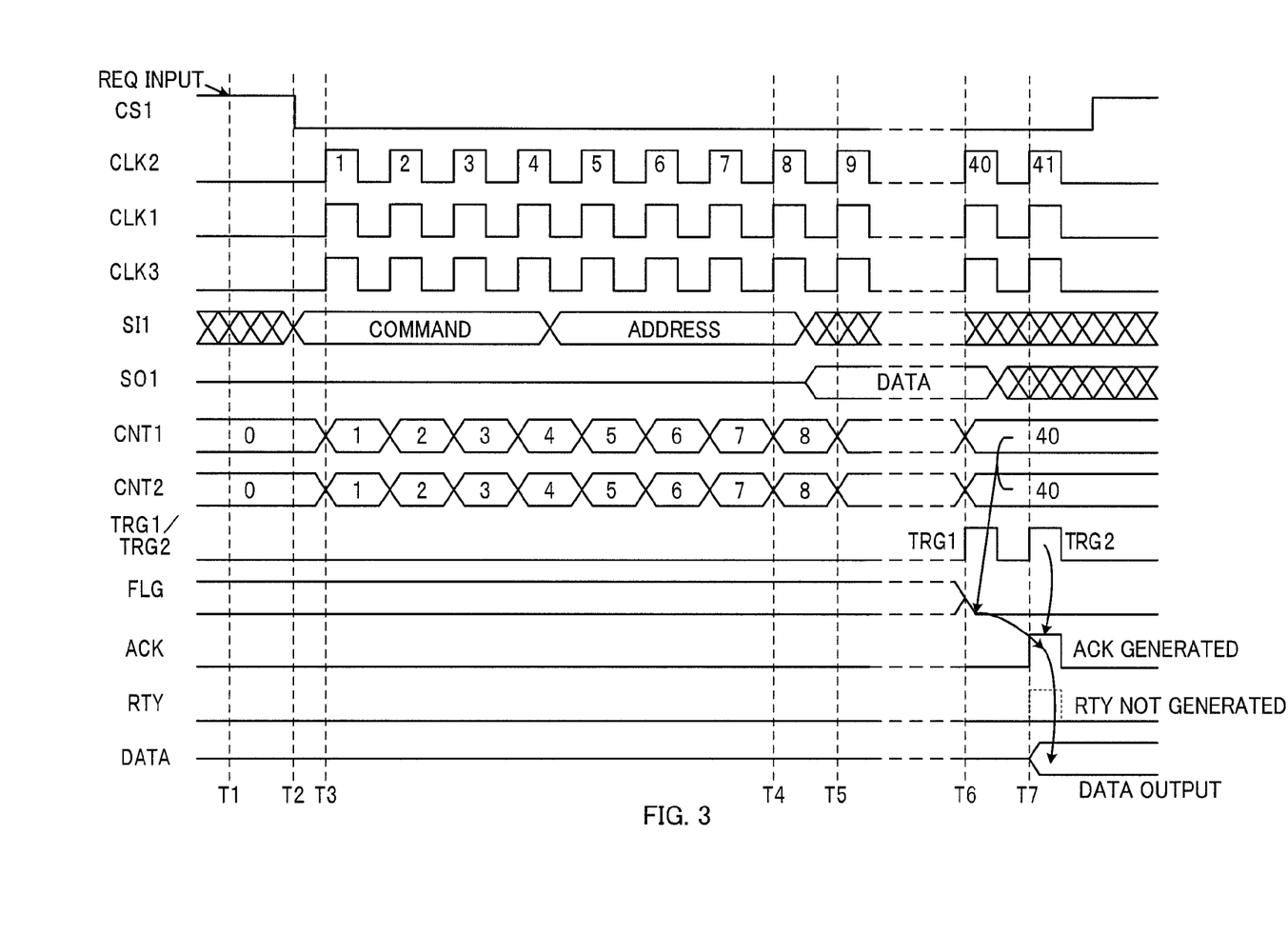
FIG. 3 is a timing chart illustrating an operation of a system LSI 10 if a noise is not generated at terminals 22 to 27, in read access.

Here, in the read access, an operation of the system LSI 10 when a noise is not generated in the terminals 22 to 27 will be described. Referring to FIG. 3, operations of the counters 50 and 90, the I/O buffer 60, the output circuits 70 and 80, and the detection circuit 100 will be described as a representative example.

In an embodiment of the present invention, it is assumed that the 4-bit address ADDRESS and the 4-bit command CMD are held in the data output circuit 44. It is also assumed that the read data SO1 inputted from the serial flash memory 11 is 32-bit data. Moreover, in an embodiment of the present invention, in the read access, the cycle number of the clock CLK2 required for an output of the address ADDRESS is 4, the cycle number of the clock CLK2 required for an output of the command CMD is 4, the cycle number of the clock CLK2 required for an input of the read data SO1 is 32, and the cycle number of the clock CLK2 required for an output of the ACK signal or RTY signal is 1, and thus, it is assumed that the maximum count value of the main counter 46 is 41.

As shown in FIG. 3, at a time T1, the access request data REQ is inputted from the microcomputer 20 to the clock generation circuit 40, the CS signal generation circuit 41, the WP signal generation circuit 42, the HOLD signal generation circuit 43, the data output circuit 44, and the register 113 and held in the register 113.

At a time T2, that is, with predetermined timing after the access request data REQ is inputted, the signal CS2 reaches the L level. Then, since the signal CS2 is outputted from the output circuit 71 as the signal CS1, access to the serial flash memory 11 is enabled.

At a time T3, that is, with predetermined timing after the access request data REQ is inputted, output of the clock CLK2 is started. Then, since the clock CLK2 is outputted from the output circuit 70 as the clock CLK1, the serial flash memory 11 becomes capable of taking in the signal CS1, the signal WP1, the signal HOLD1, and the access data SI1 in synchronization with the clock CLK1. Moreover, the clock CLK1 is outputted from the output circuit 80 as the clock CLK3. When the clock CLK2 is inputted to the counter 50, a rising edge of the clock CLK2 is counted, and incrementing of the count value CNT1 is started. On the other hand, when the clock CLK3 is inputted to the counter 90, a rising edge of the clock CLK3 is counted, and incrementing of the count value CNT2 is started. At the above-mentioned time T3, the command CMD and the address ADDRESS held in the data output circuit 44 are sequentially outputted as the access data SI2. Thus, the access data SI2 is sequentially outputted as the access data SI1 from the output circuit 74.

When the output of the address ADDRESS is completed at a time T4, the input of the read data SO1 read from the storage area of a predetermined address of the serial flash memory 11 is started on the basis of the command CMD and the address ADDRESS inputted as the access data SI1 at a time T5. At the above-mentioned time T5, the sequentially inputted read data SO1 is sequentially held in the data output circuit 45.

When the cycle number of the clock CLK2 reaches 40 at a time T6, 40 is counted by the counter 50 and outputted as the count value CNT1. On the other hand, since a noise is not generated in the terminal 22 and the clock CLK1 is outputted as the clock CLK3, 40 is counted by the counter 90 and outputted as the count value CNT2. Since the count value of the main counter 46 reaches 40, the instruction signal TRG1 is outputted from the main counter 46. When the instruction signal TRG1 is inputted to the detection circuit 100, the detection circuit 100 reads 40 as the count value CNT1 from the counter 50 and 40 as the count value CNT2 from the counter 90, to be compared. Since the count value CNT1 and the count value CNT2 are the same values, it is considered that there is agreement as a comparison result, and thus, the L-level comparison signal CMP1 is outputted from the detection circuit 100. Therefore, if the comparison signal CMP1 is at the L level, it is detected that a noise is not generated in the clock CLK3. Moreover, since a noise is not generated in the terminals 23 to 27, here, the count values are the same in each two values of the count values CNT3 and 4, the count values CNT5 and 6, the count values CNT7 and 8, and the count values CNT9 and 10. Therefore, the comparison signals CMP2 to 5 respectively outputted from the detection circuits 101 to 104 are all at the L level, and thus, the L-level flag FLG is outputted from the OR circuit 111.

If the cycle number of the clock CLK2 reaches 41 at a time T7, that is, the count value of the main counter 46 reaches 41, the instruction signal TRG2 is outputted from the main counter 46. If the instruction signal TRG2 is inputted to the counter 50 and the counter 90, the respective count values are reset. When the instruction signal TRG2 is inputted to the ACK generation circuit 112, the flag FLG inputted from the OR circuit 111 is at the L level, and thus, the signal ACK is outputted to the data output circuit 45 and the microcomputer 20. Then, the held read data SO1 is outputted as the data DATA to the microcomputer 20, as well as it is notified to the microcomputer 20 that the predetermined access has been performed.

Subsequently, in the read access, an operation of the system LSI 10 will be described when a noise is generated in the terminals 22 to 27 with predetermined timing. Here, referring to FIG. 4, operations of the counters 50 and 90, the I/O buffer 60, the output circuits 70 and 80, and the detection circuit 100 will be described as a representative example when a noise is generated at times T11 to T12, which will be described later.

Figure 4:
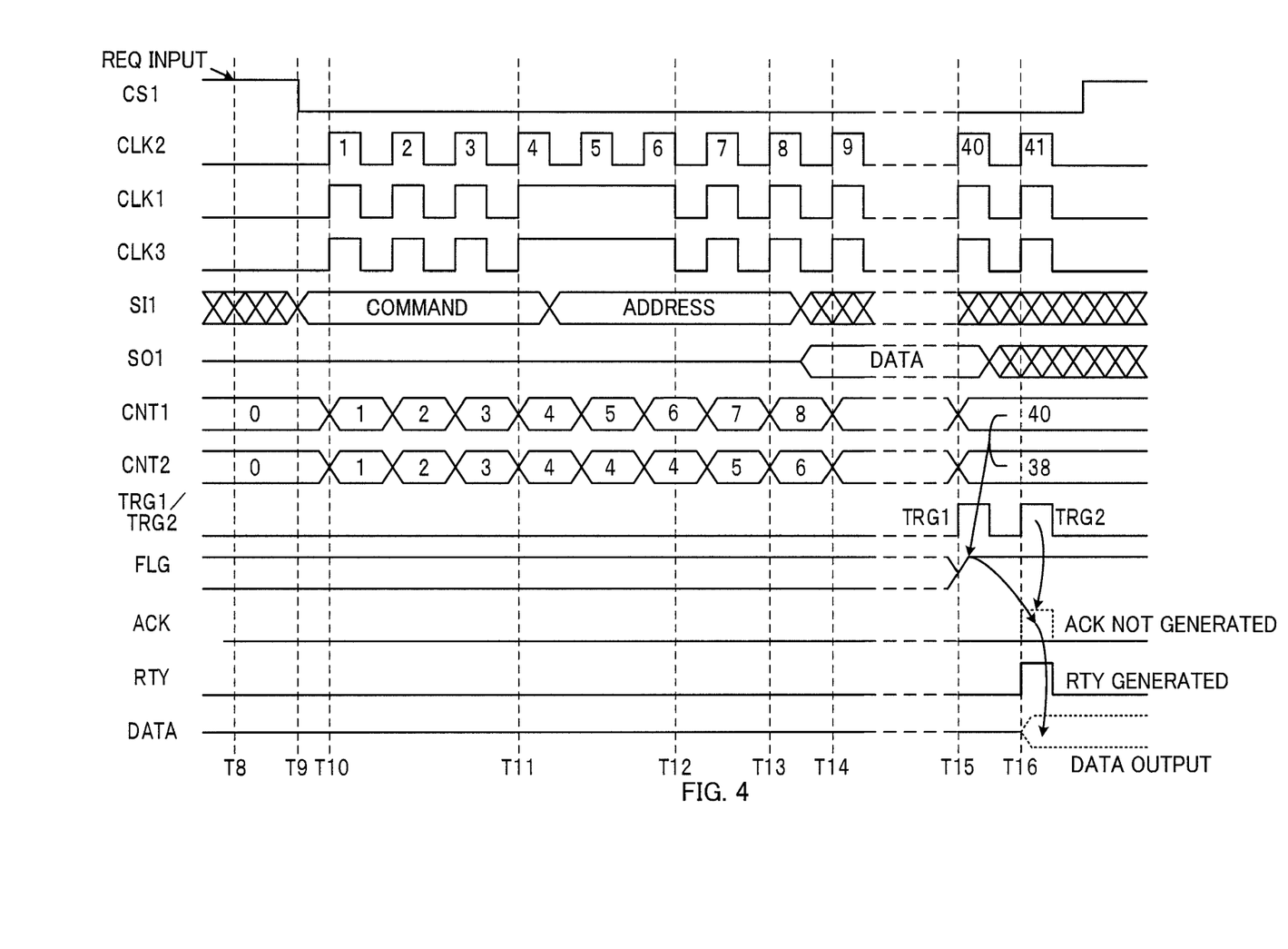
FIG. 4 is a timing chart illustrating an operation of a system LSI 10 if a noise is generated with predetermined timing at terminals 22 to 27, in read access.

As shown in FIG. 4, an operation from a time T9 to a time T11 is a read access operation similar to that in the case without noise generation on the basis of the access request data REQ inputted at a time T8.

From the time T11 to the time T12, it is assumed that a noise is generated in the terminal 22 while the clock CLK1 is outputted from the output circuit 70, and a voltage level of the terminal 22 is fixed at the H level. In this case, the clock CLK3 that is fixed at the H level according to the terminal 22 is outputted from the output circuit 80. Therefore, in the sixth cycle of the clock CLK2, 4 is outputted as the count value CNT2. On the other hand, 6 is counted by the counter 50 and outputted as the count value CNT1.

Since no noise is generated in the operation from a time T13 to a time T14, the read access operation similar to that as described above is performed on the basis of the access request data REQ.

When the cycle number of the clock CLK2 reaches 40 at a time T15, 40 is counted by the counter 50 and outputted as the count value CNT1. On the other hand, since the count value is not incremented at the fifth and sixth cycles of the clock CLK2, 38 is counted as the count value CNT2 by the counter 90. When the count value of the main counter 46 reaches 40, the instruction signal TRG1 is outputted from the main counter 46. When the instruction signal TRG1 is inputted to the detection circuit 100, the detection circuit 100 reads 40 as the count value CNT1 from the counter 50 and 38 as the count value CNT2 from the counter 90, to be compared. Since the count value CNT1 and the count value CNT2 are different values, it is considered that there is not agreement as a comparison result, and thus, the H-level comparison signal CMP1 is outputted from the detection circuit 100. Therefore, if the comparison signal CMP1 is at the H level, it is detected that a noise is generated in the clock CLK3. Moreover, since the noise is generated in the terminals 23 to 27, here, the count values are not the same in each two values of the count values CNT3 and 4, the count values CNT5 and 6, the count values CNT7 and 8, and the count values CNT9 and 10. Therefore, the comparison signals CMP2 to 5 respectively outputted from the detection circuits 101 to 104 are all at the H level, and thus, the H-level flag FLG is outputted from the OR circuit 111.

If the cycle number of the clock CLK2 reaches 41 at a time T16, that is, if the count value of the main counter 46 reaches 41, the instruction signal TRG2 is outputted from the main counter 46. If the instruction signal TRG2 is inputted to the counter 50 and the counter 90, the respective count values are reset. When the instruction signal TRG2 is inputted to the ACK signal generation circuit 112, the flag FLG inputted from the OR circuit 111 is at the H level, and thus, the signal ACK is not outputted to the data output circuit 45 and the microcomputer 20. Therefore, the read data SO1 continues to be held in the data output circuit 45. On the other hand, the signal RTY is outputted to the register 113 and the access request data REQ held at the register 113 is outputted. On the basis of the inputted access request data REQ, signals are allowed to be generated in each of the clock generation circuit 40, the CS signal generation circuit 41, the WP signal generation circuit 42, the HOLD signal generation circuit 43, and the data output circuit 44, and thus, the above-mentioned read access is performed again.

In the interface circuit 21 according to an embodiment of the present invention with the configuration described above, the output circuit 70 outputs the inputted clock CLK2 to the terminal 22 as the clock CLK1 in an embodiment of the present invention. Then, the output circuit 80 outputs the clock CLK3 according to change in the voltage level of the terminal 22. From a time when the clock CLK2 is inputted to the output circuit 70 and during a period when the predetermined access is performed, the counter 50 counts the number of times the logic level of the inputted clock CLK2 is changed, and the counter 90 counts the number of times the logic level of the inputted clock CLK3 is changed. When the instruction signal TRG1 is inputted from the main counter 46, the detection circuit 100 reads the count value CNT1 from the counter 50 and the count value CNT2 from the counter 90, to be compared. If a noise is not generated in the terminals 22 to 27, there is agreement as a comparison result, and thus, the detection circuit 100 outputs the L-level comparison signal CMP1. Therefore, it is detected that the predetermined access has been performed. On the other hand, if a noise is generated in the terminals 22 to 27, there is not agreement as a comparison result, and thus, the detection circuit 100 outputs the H-level comparison signal CMP1. Therefore, it is detected that the predetermined access has not been performed. From the above, as compared with a method of detecting whether access is performed normally by adding a parity bit to data to be transmitted and received, for example, the parity bit is not added in an embodiment of the present invention. Therefore, an increase in data amount in access is suppressed, and it may be detected whether the memory access is performed normally without the access speed being lowered.

In an embodiment of the present invention, a noise generated in the terminal 22 is detected by the counters 50 and 90 and the detection circuit 100. The counter 50 counts the rising edges of the clock CLK2 that is inputted while the predetermined access is performed; and the counter 90 counts the rising edges of the clock CLK3 that is inputted while the predetermined access is performed. Therefore, as mentioned above, it may be detected whether or not a noise is generated in the terminals 22 to 27 on the basis of the comparison result of the read count values. Here, it is possible to detect whether or not the clock CLK2 is identical to the clock CLK3 on the basis of an output of an EXOR gate by inputting the clock CLK2 and the clock CLK3 not to the counters 50 and 90 and the detection circuit 100 but to the EXOR gate, for example. However, if a delay is generated between the inputted clock CLK2 and the inputted clock CLK3, the EXOR gate might output a wrong comparison result. On the other hand, in an embodiment of the present invention, the counters 50 and 90 count the rising edges of the inputted clocks, respectively, and thus, even if a delay is generated between the inputted clock CLK2 and the inputted clock CLK3, a wrong comparison result is not outputted. Therefore, in an embodiment of the present invention, the numbers of times the logic levels of the clock CLK2 and the clock CLK3 are changed may be accurately compared by using the counters.

In an embodiment of the present invention, if it is detected that a noise is generated in the terminal 22, the ACK signal generation circuit 112 outputs the signal RTY. If the signal RTY is inputted, the register 113 outputs the predetermined access request data REQ held therein to the clock generation circuit 40, the CS signal generation circuit 41, the WP signal generation circuit 42, the HOLD signal generation circuit 43, and the data output circuit 44 so as to perform the predetermined access again. Therefore, in an embodiment of the present invention, if generation of a noise is detected, the predetermined access can be autonomously performed again.

In an embodiment of the present invention, on the basis of the clock CLK 2, if the count value of the main counter 46 reaches 40, the instruction signal TRG1 is outputted. Then, if the instruction signal TRG1 is inputted, the detection circuit 100 reads the count values CNT1 and CNT2 respectively inputted from the counters 50 and 90, to be compared, and outputs the comparison signal CMP1. Thus, in an embodiment of the present invention, even if the cycle of the clock CLK2 is changed due to change in data transfer speed or the like, for example, the comparison signal CMP1 may be outputted to the detection circuit 100 with such timing that is one cycle prior to reliable completion of the predetermined access.

The above embodiments of the present invention are simply for facilitating the understanding of the present invention and are not in any way to be construed as limiting the present invention. The present invention may variously be changed or altered without departing from its spirit and encompass equivalents thereof.

In an embodiment of the present invention, a configuration is made such that, when the microcomputer 20 transmits/receives program data to/from the serial flash memory 11 through the interface circuit 21, a noise is detected by the I/O buffers 60 to 64, the counters 50 to 54, 90 to 94, and the detection circuits 100 to 104, which correspond to the terminals 22 to 27 of the interface circuit 21, respectively, so as to be able to detect whether or not the data is normal. For example, when the microcomputer transmits/receives data for controlling a motor to/from the register included in a motor driving circuit, the I/O buffer 60, the counters 50 and 90, and the detection circuit 100 may be provided corresponding to a terminal to which the microcomputer transmits the data. In this case, a noise generated in the terminal is detected, to be able to detect whether the data is normal. In this case, the register included in the motor driving circuit corresponds to the storage circuit.

In an embodiment of the present invention, the main counter 46 outputs the instruction signal TRG1 when the count value reaches 40, and outputs the instruction signal TRG2 when the count value reaches 41, according to the cycle number 41 of the clock CLK2. In an embodiment of the present invention, this is not limitative, a configuration may be made such that the instruction signal TRG1 is outputted when the TRG count value reaches 30 and the instruction signal TRG2 is outputted when the count value reaches 41, for example. In this case also, a noise can be detected that is generated in the terminal 22 during a period until a time when the cycle number of the clock CLK2 reaches 30. A configuration may be made such that, after the count value of the main counter 46 reaches 41, the microcomputer outputs the instruction signal TRG1 when the cycle number of the clock CLK2 reaches 42 and the microcomputer outputs the instruction signal TRG2 when the cycle number of the clock CLK2 reaches 43, for example. In this case also, a noise can be detected that is generated in the terminal 22 during a period until a time when the cycle number of the clock CLK2 reaches 43.

In an embodiment of the present invention, a noise generated in the terminals 22 to 27 is detected by the comparison signals CMP 1 to 5 respectively outputted from the detection circuits 100 to 104. Then, a configuration is made such that the OR circuit 111 outputs the signal FLG on the basis of the comparison signals CMP1 to 5 and the ACK signal generation circuit 112 outputs the signal ACK to the microcomputer 20 on the basis of the signal FLG. However, a configuration may also be made such that the comparison signal CMP3 outputted by the detection circuit 102 is outputted to the microcomputer 20, to detect a noise generated in the terminal 26 while the signal WP1 is outputted. In this case, it can be detected whether or not the program data stored in the serial flash memory 11 is destroyed by accidentally writing data into a write inhibited area.

In an embodiment of the present invention, the counters 51 to 53 are similar to the counter 50 except that the respectively inputted signals of logic levels are the signal CS2, the signal WP2, and the signal HOLD2, however, the number of times the logic levels of the signal CS2, the signal WP2, and the signal HOLD2 are changed is smaller than the number of times the logic level of the clock CLK2 is changed, and thus, the counters 51 to 53 may be configured with a counter with the maximum count value smaller than that of the counter 50.

In an embodiment of the present invention, if a noise is generated in the terminal 22 and the clock CLK3 affected by a noise in the terminal 22 is outputted from the output circuit 80, the number of times the logic level of the clock CLK3 is changed might be greater than the number of times the logic level of the clock CLK2 is changed. Therefore, in an embodiment of the present invention, the counter 90 may be configured with a counter with the maximum count value greater than that of the counter 50.

What is claimed is:

1. An interface circuit comprising:
   a first output circuit configured to allow an access signal to be input thereto and output the access signal to a storage circuit, the access signal capable of being changed to one logic level or the other logic level for accessing the storage circuit;
   a second output circuit configured to output the access signal outputted from the first output circuit; and
   a comparison circuit configured to
      compare the number of times a logic level of the access signal inputted to the first output circuit is changed and the number of times a logic level of the access signal outputted from the second output circuit is changed, and
      output a comparison signal indicating whether or not predetermined access has been performed on the basis of the access signal inputted to the first output circuit, after at least a part of the access signal is inputted to the first output circuit.

2. The interface circuit according to claim 1, wherein the comparison circuit includes:
   a first counter configured to count on the basis of a predetermined edge of the access signal inputted to the first output circuit;
   a second counter configured to count on the basis of the predetermined edge of the access signal outputted from the second output circuit; and
   a comparison signal output circuit configured to
      output the comparison signal indicating that the predetermined access has been performed, when an amount of change in count value of the first counter is equal to an amount of change in count value of the second counter, and
      output the comparison signal indicating that the predetermined access has not been performed, when the amount of change in count value of the first counter is different from the amount of change in count value of the second counter,
      during a time period from a time when at least apart of the access signal is inputted to the first output circuit to a time when a predetermined time has elapsed.

3. The interface circuit according to claim 2, further comprising
   an access signal generation circuit configured to output the access signal to the first output circuit on the basis of the comparison signal indicating that the predetermined access has not been performed.

4. The interface circuit according to claim 2, wherein
   the access signal includes a clock signal with a predetermined cycle; and
   the comparison signal output circuit outputs the comparison signal on the basis of the clock signal, after the predetermined time has elapsed since at least a part of the clock signal is inputted to the first output circuit.

5. The interface circuit according to claim 3, wherein
   the access signal includes a clock signal with a predetermined cycle; and
   the comparison signal output circuit outputs the comparison signal on the basis of the clock signal, after the predetermined time has elapsed since at least a part of the clock signal is inputted to the first output circuit.

* * * * *